(12) United States Patent
Nagami

(10) Patent No.: US 11,231,619 B2
(45) Date of Patent: Jan. 25, 2022

(54) LIGHT BUNDLE CONTROL MEMBER, LIGHT EMITTING DEVICE, AREA LIGHT SOURCE DEVICE, AND DISPLAY DEVICE

(71) Applicant: Enplas Corporation, Saitama (JP)

(72) Inventor: Haruto Nagami, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 160 days.

(21) Appl. No.: 16/611,985

(22) PCT Filed: May 11, 2018

(86) PCT No.: PCT/JP2018/018250
§ 371 (c)(1),
(2) Date: Nov. 8, 2019

(87) PCT Pub. No.: WO2018/207902
PCT Pub. Date: Nov. 15, 2018

(65) Prior Publication Data
US 2021/0165279 A1 Jun. 3, 2021

(30) Foreign Application Priority Data
May 11, 2017 (JP) .............................. JP2017-094888

(51) Int. Cl.
*G02F 1/133* (2006.01)
*G02F 1/1335* (2006.01)
(Continued)

(52) U.S. Cl.
CPC ..... *G02F 1/133607* (2021.01); *G02B 3/0056* (2013.01); *G02B 3/04* (2013.01); *G02F 1/133603* (2013.01)

(58) Field of Classification Search
CPC ......... G02F 1/133607; G02F 1/133603; G02B 3/0056; G02B 3/04
See application file for complete search history.

(56) References Cited

U.S. PATENT DOCUMENTS

| 2010/0135028 A1 | 6/2010 | Kokubo |
| 2012/0099026 A1 | 4/2012 | Yokota |
| 2018/0188608 A1 | 7/2018 | Fujii et al. |

FOREIGN PATENT DOCUMENTS

| JP | 2009-043628 A | 2/2009 |
| JP | 2013-105076 A | 5/2013 |

(Continued)

OTHER PUBLICATIONS

English translation of JP2013-105076A (Year: 2013).*
International Search Report from International Application No. PCT/JP2018/018250 dated Jul. 31, 2018.

*Primary Examiner* — Anne M Hines
(74) *Attorney, Agent, or Firm* — Brundidge & Stanger, P.C.

(57) ABSTRACT

A light bundle control member comprises: an incident plane which is an inner surface of a recess opening toward a back side so as to intersect a central axis of the light bundle control member; an exit plane disposed on a front side so as to intersect the central axis; a back surface which is connected to an opening edge of the recess and formed so as to be spaced apart from the opening edge of the recess; and a protrusion disposed on the back surface and protruding from the back surface toward the back side. A tip-end surface of the protrusion and at least an area surrounding the protrusion on the back surface have different properties.

7 Claims, 12 Drawing Sheets

(51) Int. Cl.
*G02B 3/00* (2006.01)
*G02B 3/04* (2006.01)
*G02F 1/13357* (2006.01)

(56) References Cited

FOREIGN PATENT DOCUMENTS

| | | | |
|---|---|---|---|
| JP | 2013105076 A | * | 5/2013 |
| JP | 2017-017001 A | | 1/2017 |
| WO | 2011001752 A1 | | 1/2011 |

* cited by examiner

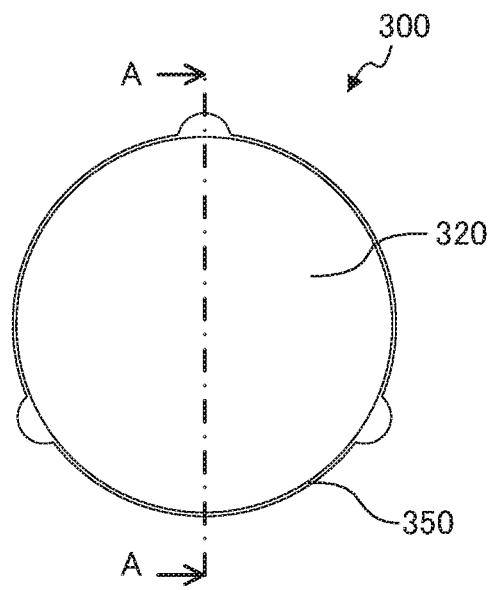
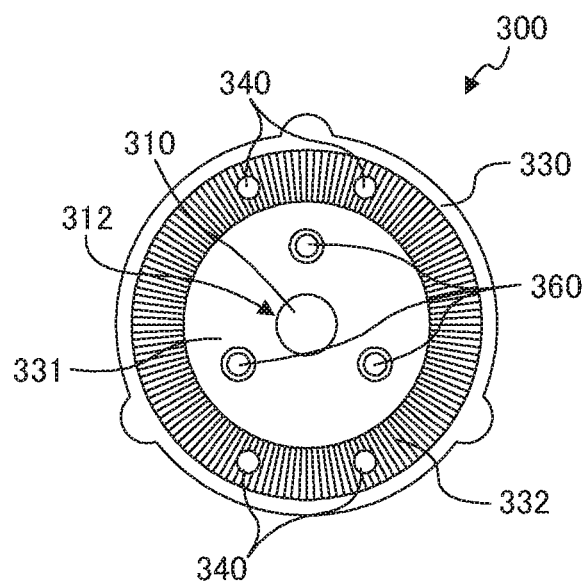
FIG. 6A
FIG. 6C
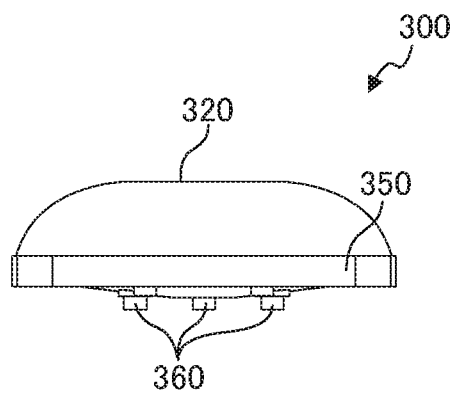
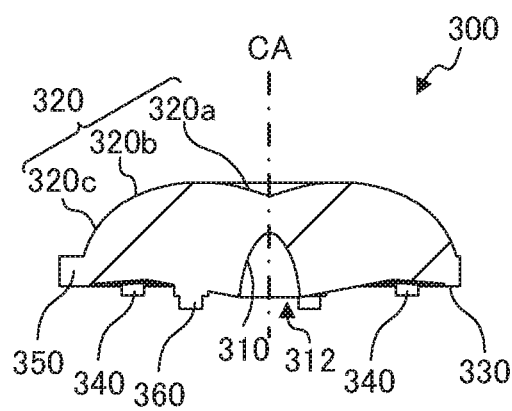
FIG. 6B
FIG. 6D

LIGHT BUNDLE CONTROL MEMBER, LIGHT EMITTING DEVICE, AREA LIGHT SOURCE DEVICE, AND DISPLAY DEVICE

TECHNICAL FIELD

The present invention relates to a light flux controlling member, a light emitting device, a surface light source device and a display device.

BACKGROUND ART

Some transmitting image display apparatuses such as liquid crystal display apparatuses use a direct surface light source device as a backlight. In recent years, direct surface light source devices including a plurality of light emitting elements as the light source have been used.

For example, a direct surface light source device includes a substrate, a plurality of light emitting elements, a plurality of light flux controlling members and a light diffusion member. Each of the light emitting elements is, for example, a light-emitting diode (LED) such as a white light-emitting diode. The light emitting elements are disposed on the substrate in a lattice. The light flux controlling member that spreads the light of the light emitting element in the plane direction of the substrate is disposed over each light emitting element. The light emitted from the light flux controlling member is diffused by the light diffusion member so as to illuminate an illumination target member (e.g., a liquid crystal panel) in a planar fashion (see, for example, PTL 1).

FIG. 1 illustrates a configuration of conventional light emitting device 10 disclosed in PTL 1. FIG. 1A is a light path diagram in a cross section of conventional light emitting device 10, and FIG. 1B is a light path diagram in a cross section of another conventional light emitting device 20.

As illustrated in FIG. 1A, light emitting device 10 includes light emitting element 11 and light flux controlling member 12. Light flux controlling member 12 includes incidence surface 13 and emission surface 14. Incidence surface 13 is an inner surface of a recess disposed opposite the light-emitting surface of light emitting element 11, and receives light emitted from light emitting element 11. Emission surface 14 emits, to the outside, light entered from incidence surface 13.

As illustrated in FIG. 1A, light emitted from light emitting element 11 enters light flux controlling member 12 from incidence surface 13, and reaches emission surface 14. The majority of the light reaching emission surface 14 is emitted to the outside from emission surface 14 (see the solid arrow). A part of the light reaching emission surface 14 is internally reflected toward rear surface 15 of emission surface 14, and reaches rear surface 15. A part of the light reaching rear surface 15 is emitted from rear surface 15 toward substrate 16, and reflected by substrate 16, and is then, entered from rear surface 15 before being emitted from emission surface 14 (see the thick dotted arrow). Another part of the light reaching rear surface 15 is internally reflected by rear surface 15 toward emission surface 14, and is then emitted from emission surface 14 (see the thin dotted arrow).

In this manner, light internally reflected by emission surface 14 becomes light travelling toward a part immediately above light flux controlling member 12, and consequently causes a non-uniform distribution (luminance unevenness) in the luminance of light emitted from light emitting device 10. In addition, when the light reaching rear surface 15 is emitted from rear surface 15, a part of light is absorbed by the substrate, and consequently significant light loss results. In view of this, PTL 1 further provides another light emitting device 20 including another light flux controlling member 22 capable of solving the above-mentioned problem.

As illustrated in FIG. 1B, in other light emitting device 20, annular recess 29 is formed in rear surface 15. Annular recess 29 includes inclined surface 27 inclined so as to come closer to the rear side as the distance thereof from central axis CA increases, and inclined surface 28 disposed inside inclined surface 27 and inclined so as to come closer to the front side as the distance thereof from central axis CA increases. Recess 29 is formed in a region where light internally reflected by emission surface 14 easily reaches.

As illustrated in FIG. 1B, in light emitting device 20, light internally reflected by emission surface 14 reaches a predetermined region where recess 29 is formed in rear surface 15. A part of the light reaching the predetermined region is reflected by inclined surface 27 in a lateral direction, and emitted to the outside.

In addition, PTL 1 discloses rear surface 15 composed of a grain surface. Rear surface 15 composed of the grain surface scatters light internally reflected by emission surface 14 and light directly reaching rear surface 15 from light emitting element 11.

With this configuration, in light emitting device 20 disclosed in PTL 1, light reflected by emission surface 14 does not tend to be directed toward a region right above light flux controlling member 22, or does not tend to be absorbed by substrate 16. In addition, the light reaching rear surface 15 can be scattered. Thus, light emitting device 20 including light flux controlling member 22 disclosed in PTL 1 can uniformly and efficiently emit light in comparison with conventional light emitting device 10 including light flux controlling member 12.

CITATION LIST

Patent Literature
PTL 1
Japanese Patent Application Laid-Open No. 2009-043628

SUMMARY OF INVENTION

Technical Problem

However, for example, in the case where the light flux controlling member disclosed in PTL 1 is molded by injection molding, a trace of the extrusion with an ejector pin is undesirably left in the rear surface of the light flux controlling member. The region extruded with an ejector pin is molded with a metal mold piece different from a metal mold piece for molding the rear surface. Consequently, the extruded region and the region of the rear surface other than the extruded region have different surface properties, and hence the desired optical characteristics of the light flux controlling member may not be obtained.

An object of the present invention is to provide a light flux controlling member, a light-emitting device, a surface light source device and a display device which provide desired light distribution characteristics without causing local bright spot and/or luminance unevenness due to light internally reflected by the emission surface.

Solution to Problem

A light flux controlling member of an embodiment of the present invention is configured to control a distribution of light emitted from a light-emitting element, the light flux controlling member including: an incidence surface that is an inner surface of a recess that is open toward a rear side of the light flux controlling member so as to intersect a central axis of the light flux controlling member, the incidence surface being configured to allow incidence of the light emitted from the light-emitting element; an emission surface disposed on a front side of the light flux controlling member so as to intersect the central axis, the emission surface being configured to emit, to outside, light entered from the incidence surface; a rear surface connected with an opening edge of the recess, the rear surface being formed so as to extend away from the opening edge of the recess; and a protrusion disposed on the rear surface so as to protrude toward the rear side from the rear surface. An end surface of the protrusion and at least a region surrounding the protrusion in the rear surface have different properties.

A light-emitting device according to an embodiment of the present invention includes: a light-emitting element; and the above-mentioned light flux controlling member that is disposed such that the central axis is aligned with an optical axis of the light-emitting element.

A surface light source device according to an embodiment of the present invention includes: a plurality of the above-mentioned light-emitting devices; and a light diffusion plate configured to allow light from the plurality of light-emitting devices to pass through the light diffusion plate while diffusing the light.

A display device according to an embodiment of the present invention includes: the above-mentioned surface light source device; and an irradiation target member configured to be irradiated with light emitted from the above-mentioned surface light source device.

Advantageous Effects of Invention

In the present invention, the end surface of the protrusion is the region to be extruded by the ejector pin, and it is thus possible to provide a light flux controlling member, a light-emitting device, a surface light source device and a display device that provide desired light distribution characteristics without causing local bright spot.

BRIEF DESCRIPTION OF DRAWINGS

FIGS. 6A to 6D illustrate a configuration of the light flux controlling member;

DESCRIPTION OF EMBODIMENTS

A light flux controlling member, a light-emitting device, a surface light source device and a display device according to the present embodiment are described below with reference to the accompanying drawings. In the following description, as a typical example of the surface light source device according to the present embodiment, a surface light source device that includes light emitting devices disposed in a lattice and is suitable for a backlight of a liquid crystal display apparatus is described.

Embodiment 1

Configuration of Surface Light Source Device and Light-emitting Device

Figure 1A:
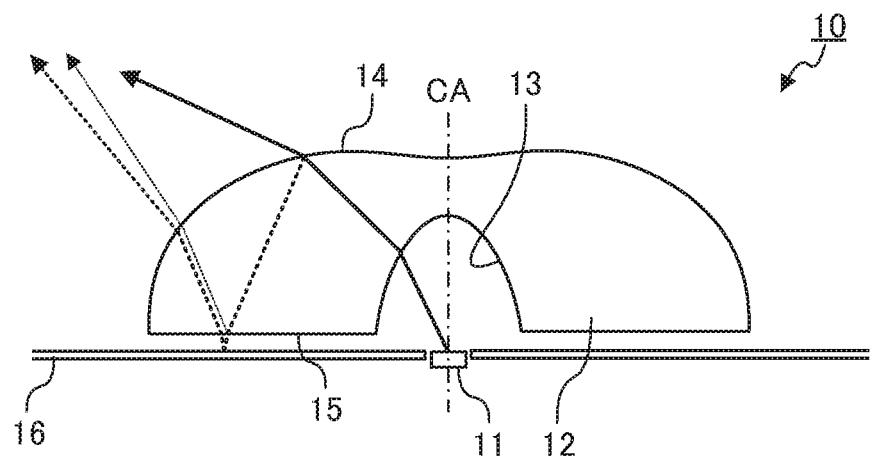
FIGS. 1A and 1B are light path diagrams in a cross-section of a light-emitting device disclosed in PTL 1.
Figure 1B:
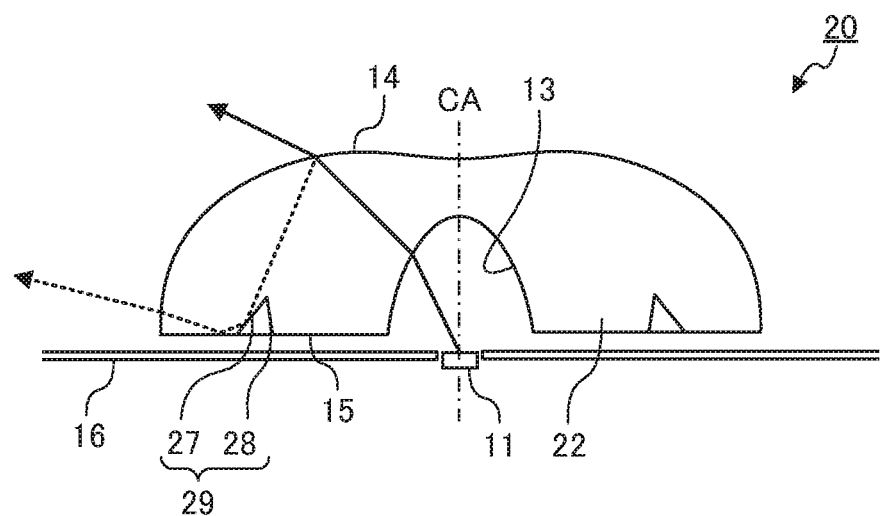
Figure 2A:
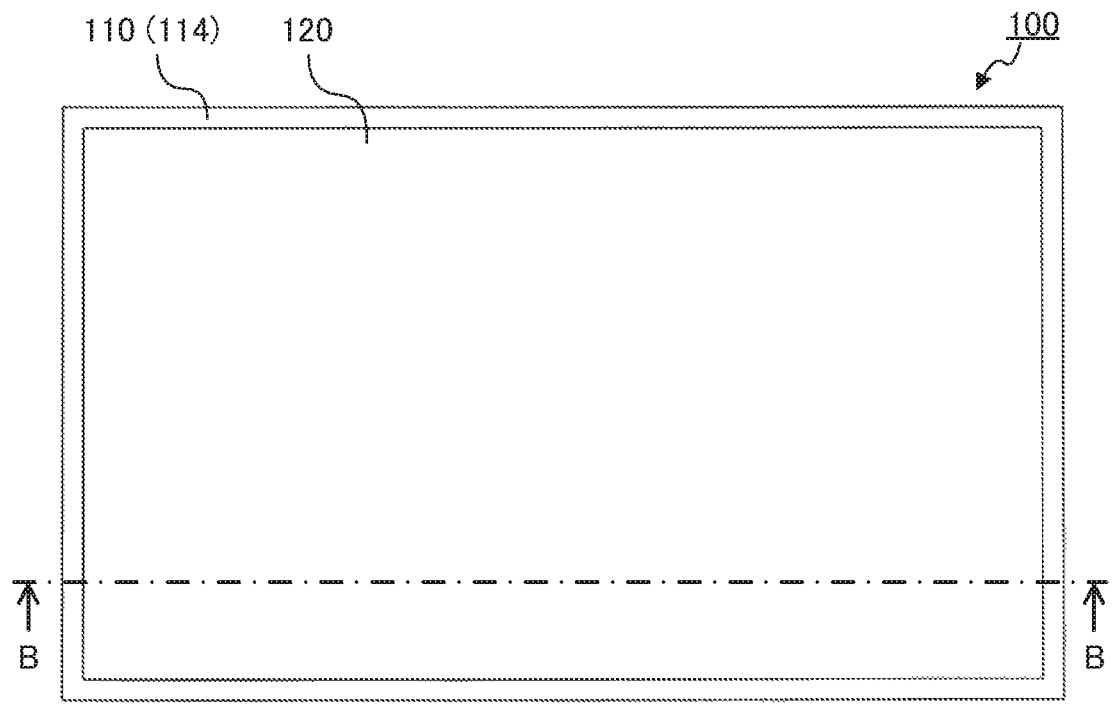
FIGS. 2A and 2B illustrate a configuration of a surface light source device according to Embodiment 1 of the present invention.
Figure 2B:
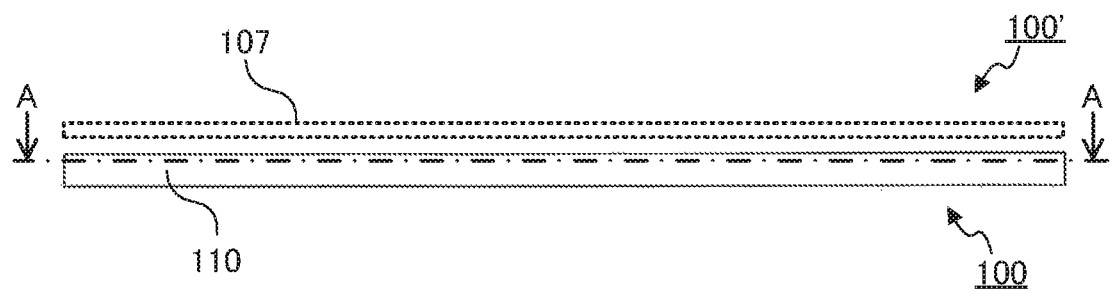
Figure 3A:
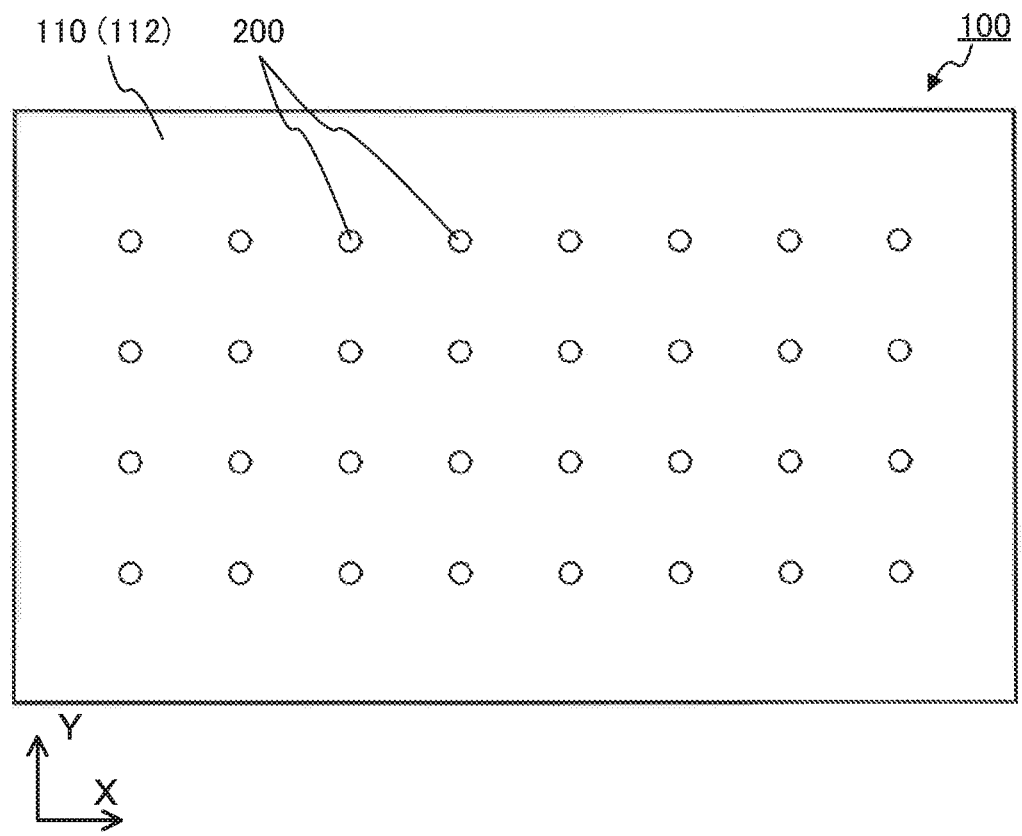
FIGS. 3A and 3B are sectional views illustrating a configuration of the surface light source device.
Figure 3B:
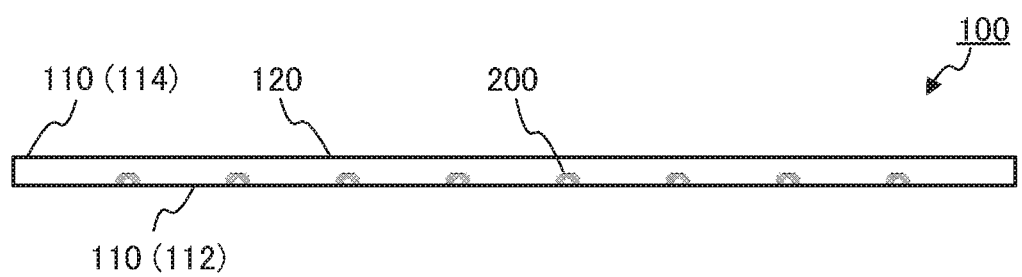
Figure 4:
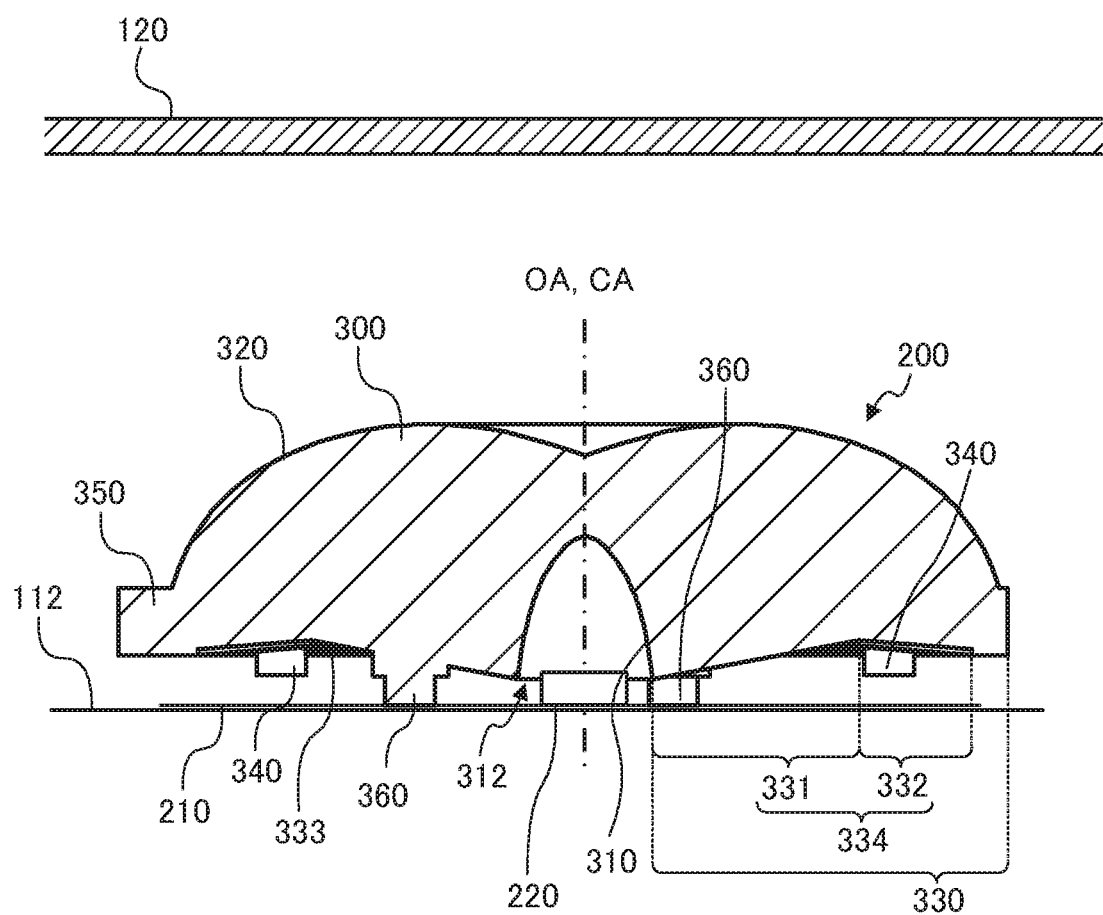
FIG. 4 is a partially enlarged sectional view of the surface light source device.

FIGS. 2 to 4 illustrate a configuration of surface light source device 100 according to Embodiment 1 of the present invention. FIG. 2A is a plan view of surface light source device 100 according to Embodiment 1 of the present invention, and FIG. 2B is a front view of surface light source device 100. FIG. 3A is a sectional view taken along line A-A of FIG. 2B, and FIG. 3B is a sectional view taken along line B-B of FIG. 2A. FIG. 4 is a partially enlarged sectional view of surface light source device 100.

As illustrated in FIGS. 2A to 4, surface light source device 100 includes housing 110, a plurality of light emitting devices 200, and light diffusion plate (illuminated surface) 120. Surface light source device 100 of the embodiment of the present invention is applicable to a backlight of a liquid crystal display apparatus. In addition, as illustrated in FIG. 2B, surface light source device 100 can be used as display device 100' when combined with a display member (illumination target member) 107 (indicated with dotted line in FIG. 2B) such as a liquid crystal panel.

A plurality of light emitting devices 200 is disposed in a lattice (in the present embodiment, a square lattice) in substrate 210 on bottom plate 112 of housing 110. The inner surface of bottom plate 112 functions as a diffusive reflection surface. In addition, top plate 114 of casing 110 is provided with an opening. Light diffusion plate 120 is disposed to cover the opening, and functions as a light emitting surface. The light emitting surface has a size of, for example, approximately 400 mm×approximately 700 mm.

A plurality of light emitting devices 200 is disposed on substrate 210 at a predetermined interval. A plurality of substrates 210 are fixed at respective predetermined positions on bottom plate 112 of casing 110. In the present embodiment, light emitting devices 200 are disposed such that the light emission center of each light emitting element 220 (the center of the light-emitting surface) is located in the square lattice. Each light emitting device 200 includes light emitting element 220 and light flux controlling member 300.

Light emitting element 220 is the light source of surface light source device 100, and is mounted on substrate 210. Light emitting element 220 is a light-emitting diode (LED) such as a white light-emitting diode, for example. Light emitting element 220 is disposed such that the light emission center thereof (the center of the light-emitting surface) is located on central axis CA of light flux controlling member 300 (see FIG. 4). Preferably, light emitting element 220 is an LED of chip-on-board (COB) type from the viewpoint of the ease of mounting and high light emission efficiency.

LEDs of COB type are known to emit a larger quantity of light in the lateral direction in comparison with conventional LEDs. Light-emitting element 220 of an LED of COB type or the like emits a large quantity of light in the lateral direction, and it is therefore necessary to control the light such that a larger quantity of light emitted in the lateral direction from light-emitting element 220 enters light flux controlling member 300. In view of this, it is preferable to dispose light-emitting element 220 such that the top surface (the light-emitting surface on the upper side) of light-emitting element 220 is located on the upper side than the lower end (opening edge) of recess 312 described later in the vertical direction.

Light flux controlling member 300 is a lens, and is fixed on substrate 210. Light flux controlling member 300 controls the distribution of light emitted from light emitting element 220 such that the light distribution spreads radially outward with respect to central axis CA. Light flux controlling member 300 is disposed over light emitting element 220 in such a manner that central axis CA thereof matches optical axis OA of light emitting element 220 (see FIG. 4). Note that incidence surface 310 and emission surface 320 of light flux controlling member 300 described later are rotationally symmetrical, and the rotation axis thereof is aligned with optical axis OA of light emitting element 220. The rotational axis of incidence surface 310 and emission surface 320 is referred to as "central axis CA of light flux controlling member." In addition, "optical axis OA of light emitting element" means a central light beam of a stereoscopic light flux from light emitting element 220.

Light flux controlling member 300 is integrally molded by injection molding. The material of light flux controlling member 300 is not limited as long as light of a desired wavelength can pass therethrough. For example, the material of light flux controlling member 100 is an optically transparent resin such as polymethylmethacrylate (PMMA), polycarbonate (PC), epoxy resin (EP) and silicone resin, or glass. A main feature of surface light source device 100 according to the present embodiment is the configuration of light flux controlling member 300. Therefore, the configuration of light flux controlling member 300 is described later in detail.

Light diffusion plate 120 is a plate-shaped member having a light diffusing property, and allows the light emitted from light emitting device 200 to pass therethrough while diffusing the light. Light diffusion plate 120 is disposed over light emitting devices 200 approximately in parallel with substrate 210. Normally, the size of light diffusion plate 120 is substantially the same as that of the illumination target member such as a liquid crystal panel. For example, light diffusion plate 120 is formed of an optically transparent resin such as polymethylmethacrylate (PMMA), polycarbonate (PC), polystyrene (PS), and styrene methyl methacrylate copolymerization resin (MS). In order to provide a light diffusing property, minute irregularities may be formed in the surface of light diffusion plate 120, or diffusing members such as beads may be dispersed in light diffusion plate 120.

In surface light source device 100 according to the embodiment of the present invention, the light emitted from each light emitting element 220 is spread by light flux controlling member 300 so as to illuminate a wide range of light diffusion plate 120. The light reaching light diffusion plate 120 from each light flux controlling member 300 passes through light diffusion plate 120 while being diffused. Thus, surface light source device 100 according to the embodiment of the present invention can uniformly illuminate a planar illumination target member (e.g., a liquid crystal panel).

Configuration of Light Flux Controlling Member

Figure 5:
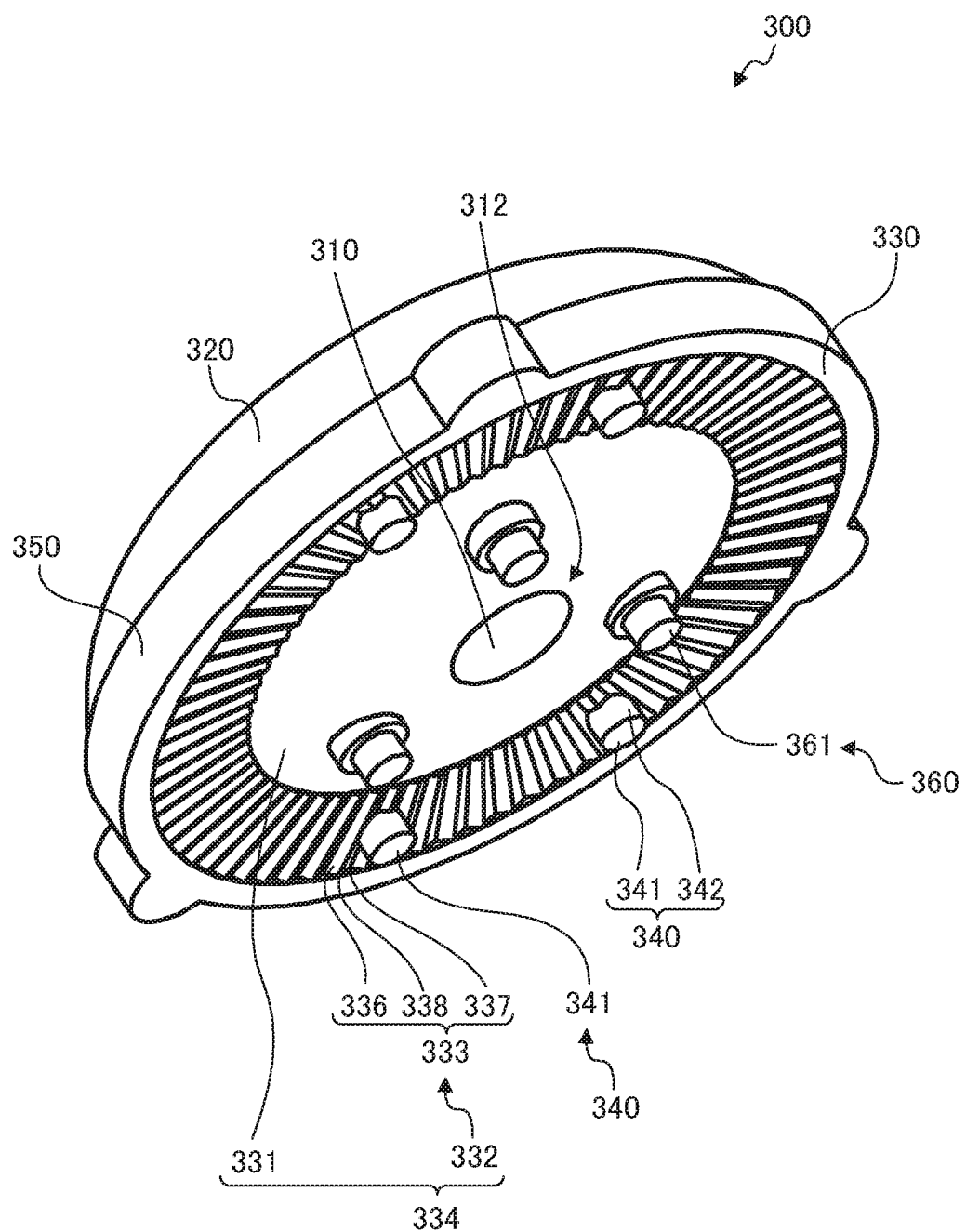
FIG. 5 is a perspective view of a light flux controlling member as viewed from the rear side.

FIGS. 5 to 6D illustrate a configuration of light flux controlling member 300 according to the present embodiment. FIG. 5 is a perspective view of light flux controlling member 300 as viewed from the bottom side. FIG. 6A is a plan view of light flux controlling member 300, FIG. 6B is a front view of light flux controlling member 300, FIG. 6C is a bottom view of light flux controlling member 300, and FIG. 6D is a sectional view taken along line A-A of FIG. 6A.

As illustrated in FIGS. 5 to 6D, light flux controlling member 300 includes incidence surface 310, emission surface 320, rear surface 330, and protrusion 340. In addition, light flux controlling member 300 includes flange part 350 configured to ease the handling of light flux controlling member 300, and leg part 360 configured to define a gap for dissipating heat from light emitting element 220 to the outside, and to position and fix light flux controlling member 300 to substrate 210.

Incidence surface 310 enters, into light flux controlling member 300, the majority of the light emitted from light emitting element 220 while controlling the travelling direction of the light. Incidence surface 310 is an inner surface of recess 312 that is open toward the rear side. Recess 312 opens at a center portion of rear surface 330 so as to intersect central axis CA of light flux controlling member 300 (optical axis OA of light emitting element 220) (see FIG. 5). That is, incidence surface 310 is disposed so as to intersect central axis CA (optical axis OA). Incidence surface 310 intersects central axis CA of light flux controlling member 300, and is substantially rotationally symmetrical (in the present embodiment, circularly symmetrical) about central axis CA.

Emission surface 320 is disposed on the front side (light diffusion plate 120 side) of light flux controlling member 300. Emission surface 320 emits the light having entered light flux controlling member 300 to the outside while controlling the travelling direction of the light. Emission surface 320 intersects central axis CA, and is rotationally symmetrical (in the present embodiment, circularly symmetrical) about central axis CA.

The shape of emission surface 320 may be set to any shape. In the present embodiment, emission surface 320 includes first emission surface 320a located in a predetermined range around central axis CA, second emission surface 320b continuously formed at the periphery of first emission surface 320a, and third emission surface 320c that connects second emission surface 320b and flange part 350 (see FIG. 6D). First emission surface 320a is a curved surface protruding toward the rear side. Second emission surface 320b is a smooth curved surface protruding toward the front side and is located at the periphery of first emission surface 320a. Second emission surface 320b has an annular protruding shape. Third emission surface 320c is a curved surface located at the periphery of second emission surface 320b.

Rear surface 330 is located on the rear side of light flux controlling member 300, and is connected with the opening edge of recess 312 such that it extends away from the opening edge of recess 312. The shape of rear surface 330 may be set to any shape. Rear surface 330 may be a flat surface or a grain surface, or, may be provided with other shapes. In the present embodiment, rear surface 330 is extended in the radial direction. In addition, in the present embodiment, annular groove 334 including a plurality of ridges 333 is disposed in rear surface 330.

Annular groove 334 is formed in rear surface 330 so as to surround recess 312 (incidence surface 310). Annular groove 334 is rotationally symmetrical about central axis CA. Annular groove 334 includes first inner surface 331 disposed on central axis CA side, and second inner surface 332 disposed at a position remote from central axis CA relative to first inner surface 331. In addition, a plurality of ridges 333 is disposed in second inner surface 332.

First inner surface 331 may be parallel to central axis CA or may be tilted such that first inner surface 331 comes closer to the front side as it goes away from central axis CA. In the present embodiment, first inner surface 331 is tilted such that first inner surface 331 comes closer to the front side as it goes away from central axis CA.

Second inner surface 332 is formed on the rear side of light flux controlling member 300 so as to surround first inner surface 331. Second inner surface 332 is tilted such that second inner surface 332 comes closer to the rear side as it goes away from central axis CA.

The position of annular groove 334 in rear surface 330 may be set to any position. It is preferable that annular groove 334 be located in rear surface 330 in a region where a large quantity of the light internally reflected by emission surface 320 reaches. Note that second inner surface 332 is located in the above-mentioned region. The arrival position of the light reflected by emission surface 320 differs depending on various factors such as the shape of emission surface 320, and therefore is appropriately set in accordance with light flux controlling member 300.

Each ridge 333 has a substantially triangular shape in a cross-section orthogonal to ridgeline 338, and is rotationally symmetrical (n-fold rotational symmetry where n is the number of ridges 333) about central axis CA. Each ridge 333 includes first inclined surface 336 having a flat shape, second inclined surface 337 having a flat shape, and ridgeline 338 disposed between first inclined surface 336 and second inclined surface 337, and functions as a total reflection prism. Ridgelines 338 are tilted such that ridgelines 338 come closer to the rear surface side as it goes away from central axis CA.

Protrusion 340 is formed in a region that makes contact with an ejector pin in a release process in the case where light flux controlling member 300 is manufactured by injection molding. To be more specific, protrusion 340 is disposed in second inner surface 332. By disposing protrusion 340 in second inner surface 332 where ridges 333 in the above-mentioned manner, light flux controlling member 300 can be appropriately released.

Protrusion 340 includes end surface 341. The shape of protrusion 340 may be set to any shape as long as the ejector pin makes contact with end surface 341 such that light flux controlling member 300 can be removed from the metal mold. Preferably, protrusion 340 has a columnar shape. In addition, end surface 341 of protrusion 340 may have a circular shape or a polygonal shape in plan view. In the present embodiment, end surface 341 of protrusion 340 has a circular shape. That is, protrusion 340 has a columnar shape in the present embodiment.

End surface 341 may have a flat surface or a curved surface, and may be roughened. As described above, it is preferable that end surface 341 be a flat surface in view of the contact with the ejector pin.

End surface 341 of protrusion 340 and at least the region surrounding protrusion 340 in rear surface 330 have different properties. Here, having "different properties" means that the surface shapes are different from each other such that the travelling directions of light reaching thereto are changed when refracted or reflected by them. In the present embodiment, ridges 333 are disposed in the region surrounding end surface 341, and the light reaching the region where ridges 333 are formed are sequentially reflected by first inclined surface 336 and second inclined surface 337. On the other hand, a part of the light reaching flat end surface 341 is specularly reflected and another part of the light is emitted from end surface 341 so as to be reflected by substrate 210 and reentered from end surface 341. That is, end surface 341 of protrusion 340 and the region surrounding protrusion 340 in rear surface 330 have different properties.

End surface 341 of protrusion 340 is located on the front side relative to contact surface 361 of leg part 360. That is, protrusion 340 is formed such that protrusion 340 is shorter than leg part 360 with respect to the rear surface. With this configuration, when fixing light flux controlling member 300 to substrate 210, protrusion 340 does not make contact with substrate 210, and light flux controlling member 300 can be appropriately fixed to substrate 210.

The height of protrusion 340 may be set to any height. Preferably, the height of protrusion 340 is 0.3 mm or greater from the viewpoint of diffusing the travelling direction of the light internally reflected by emission surface 320 such that the light is reflected or refracted not only by end surface 341 of protrusion 340, but also by side surface 342. It should be noted that the height of protrusion 340 is set such that it does not make contact with substrate 210 when light flux controlling member 300 is fixed to substrate 210. The reason for this is that, if protrusion 340 is too short, the reflection light from emission surface 320 cannot be reflected or refracted by the side surface, and hence the travelling direction of the light cannot be diffused (see FIG. 7B). In the case where rear surface 330 is a level surface, the height of protrusion 340 is the length from end surface 341 to rear surface 330. In addition, in the case where the plurality of ridges 333 are formed in rear surface 330, the height of protrusion 340 is set to a length to the portion closest to end surface 341 in the connecting portion between the protrusion 340 and ridge 333.

Leg part 360 is used for fixing light flux controlling member 300 to substrate 210. The shape of leg part 360 can be set to any shape as long as the above-described functions can be ensured. In the present embodiment, leg part 360 is formed in a substantially columnar shape. Contact surface 361 of leg part 360 and the surface surrounding leg part 360 have the same property.

Light Distribution Characteristics

Next, light paths in light flux controlling member 300 according to the present embodiment in the cross section including central axis CA were simulated. In addition, light paths in the cross section including central axis CA were also simulated in a similar manner with light flux controlling member 300A according to a comparative example in which end surface 341A is located on the front side relative to rear surface 330A.

Figure 7A:
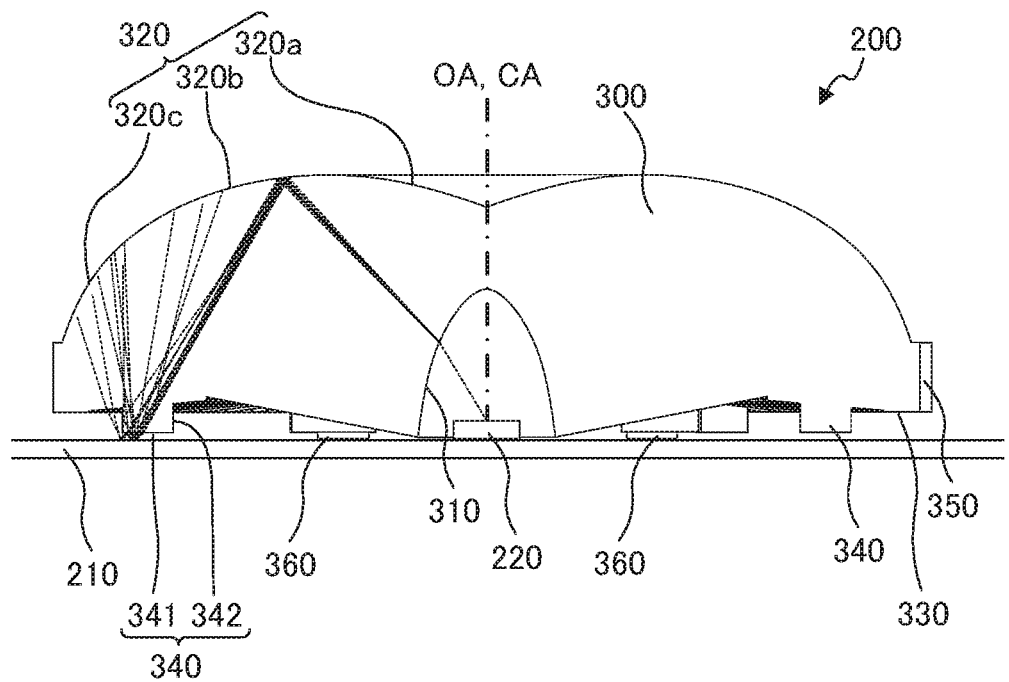
FIGS. 7A and 7B are light path diagrams in a cross-section of the light flux controlling member.
Figure 7B:
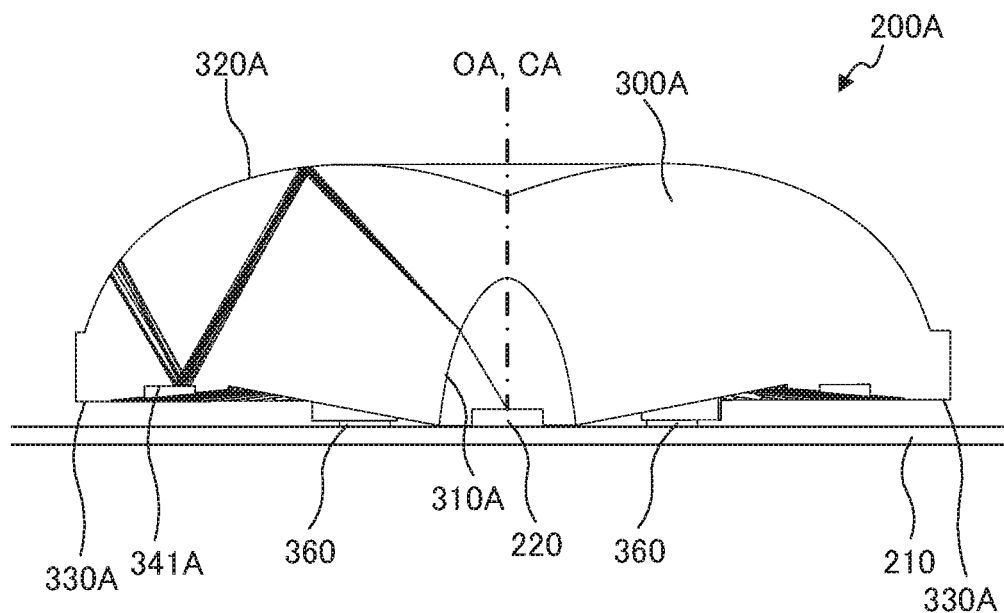

FIGS. 7A and 7B illustrate light paths of light emitted from the light emission center of light-emitting element 220 in the light flux controlling member. FIG. 7A is a light path diagram in a cross-section of light flux controlling member 300 according to the present embodiment, and FIG. 7B is a light path diagram in a cross-section of light flux controlling member 300A according to a comparative example. In FIGS. 7A and 7B, hatching is omitted to illustrate light paths.

As illustrated in FIG. 7A, in light flux controlling member 300 according to the present embodiment, light emitted from light-emitting element 220 enters light flux controlling member 300 from incidence surface 310. Next, the majority of the light entered from incidence surface 310 is emitted from emission surface 320 (omitted in the drawing). On the other hand, a part of the light entered from incidence surface 310 is internally reflected by emission surface 320 toward rear surface 330 (annular groove 334). A part of the light internally reflected by emission surface 320 reaches protrusion 340. The light having reached protrusion 340 is emitted to the outside of light flux controlling member 300 through side surface 342 and end surface 341, so as to be reflected by substrate 210 and again refracted by end surface 341 so as to enter light flux controlling member 300. Then, the light is emitted to the outside of light flux controlling member 300 from emission surface 320. Note that, although not illustrated in the drawings, another part of the light internally reflected by emission surface 320 is internally reflected (Fresnel reflection) by first inclined surface 336 and second inclined surface 337 of ridge 333, and emitted upward of light flux controlling member 300 from emission surface 320. In this manner, since end surface 341 is located on the rear side than rear surface 330, and end surface 341 of protrusion 340 and rear surface 330 in the proximity of protrusion 340 have different shapes, and, the light having reached protrusion 340 passes through end surface 341 and side surface 342, the light internally reflected by emission surface 320 is controlled so as to be diffused by ridge 333 and protrusion 340.

On the other hand, as illustrated in FIG. 7B, also in light flux controlling member 300A according to the comparative example, the majority of the light that is emitted from light-emitting element 220 and is entered from incidence surface 310A is emitted from emission surface 320A (omitted in the drawing). On the other hand, a part of the light is internally reflected by emission surface 320A toward rear surface 330A. The light having reached end surface 341A in rear surface 330A is directly internally reflected, and emitted from emission surface 320A. In this manner, in the light flux controlling member according to the comparative example in which end surface 341A is disposed on the front side than rear surface 330A, the light reflected by end surface 341A advances substantially upward of light flux controlling member 300A.

Measurement of Luminance

Next, the luminance distribution on light diffusion plate 120 of surface light source device 100 including the above-described light flux controlling member 300 was measured. To be more specific, the luminance distribution on a cross-section passing through protrusion 340 illustrated in FIG. 7A, and the luminance distribution on a cross-section that does not pass through protrusion 340 in the surface light source device including light flux controlling member 300 were measured.

Figure 8:
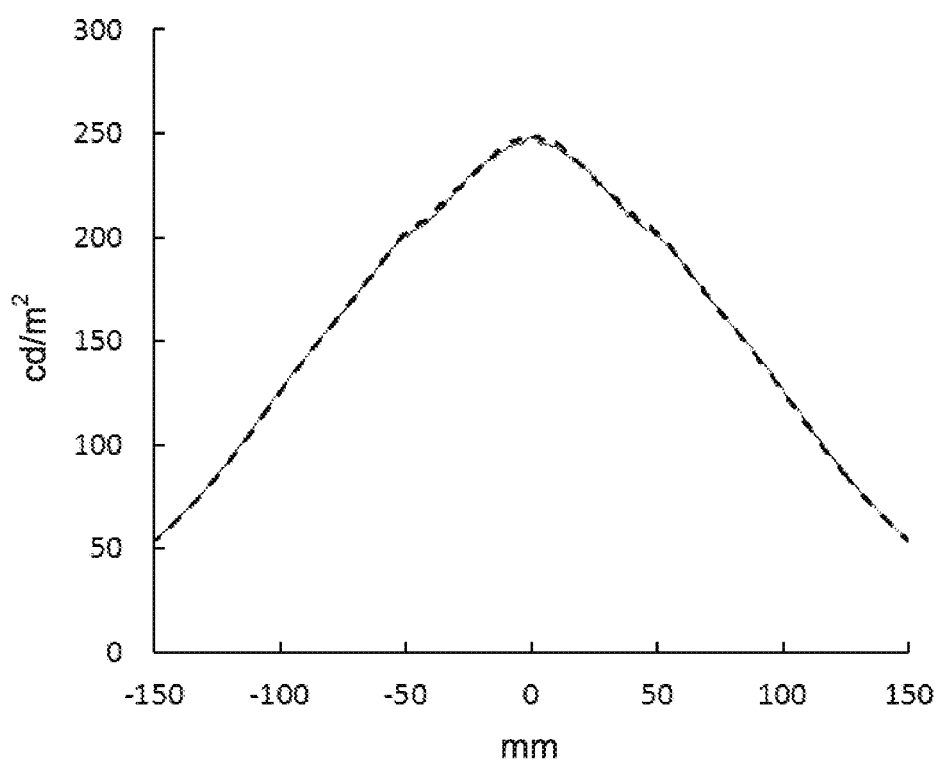
FIG. 8 is a graph illustrating a luminance distribution on a light diffusion plate.

FIG. 8 is a graph illustrating a result of the luminance measurement on the light-emitting surface of surface light source device 100. In FIG. 8, the abscissa indicates a distance (mm) from the center of (central axis CA) of the illuminated surface in the cross section including optical axis OA, and the ordinate indicates a luminance (cd/m2). In FIG. 8, the solid line represents a resulting luminance distribution on a cross-section passing through protrusion 340 illustrated in FIG. 7A in surface light source device 100 including light flux controlling member 300 according to the present invention, and the dotted line represents a resulting luminance distribution on a cross-section that does not pass through protrusion 340 in the surface light source device including light flux controlling member 300. In addition, in this measurement, light diffusion plate 120 (light-emitting surface) is disposed at a position 30 mm from substrate 210 such that light diffusion plate 120 is orthogonal to central axis CA. In addition, as light diffusion plate 120, a lamination of a diffusion sheet, a prism sheet, and a diffusion sheet was used. In addition, as light-emitting element 220, a five-surface-emission LED was used.

As illustrated in FIG. 8, the luminance distribution on a cross-section passing through protrusion 340 in surface light source device 100 including light flux controlling member 300 was equal to the luminance distribution on a cross-section that does not pass through protrusion 340. This shows that protrusion 340 does not affect the light distribution characteristics of light flux controlling member 300.

Modification

A surface light source device according to a modification of Embodiment 1 is different from the surface light source device according to Embodiment 1 only in the configuration of leg part 460 in light flux controlling member 400. In view of this, the components similar to those of surface light source device 100 are denoted with the same reference numerals and the description thereof will be omitted.

Figure 9A:
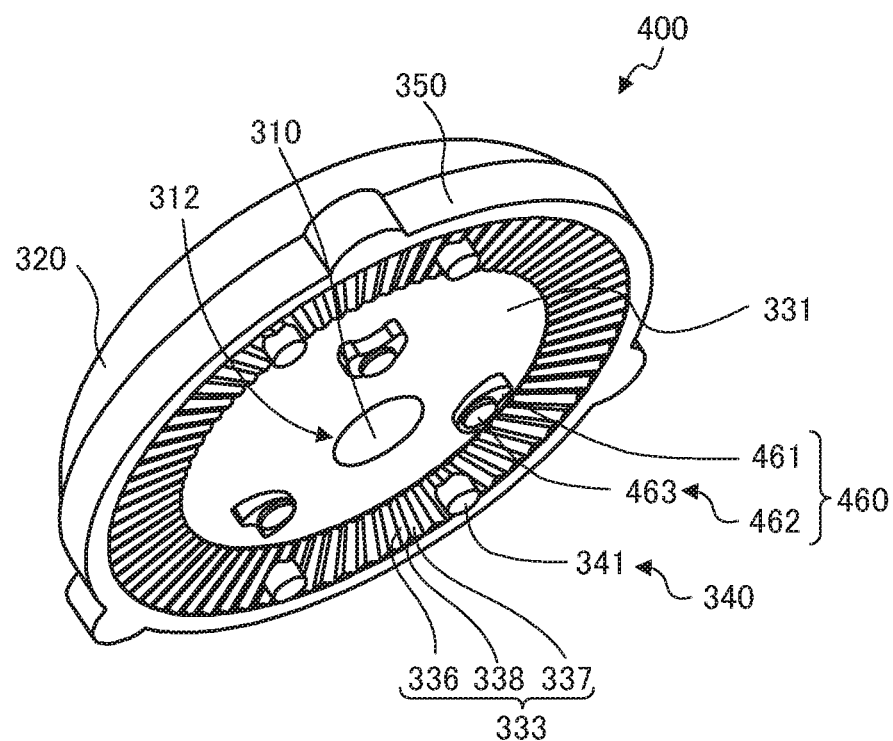
FIGS. 9A and 9B illustrate a configuration of a light flux controlling member according to a modification.
Figure 9B:
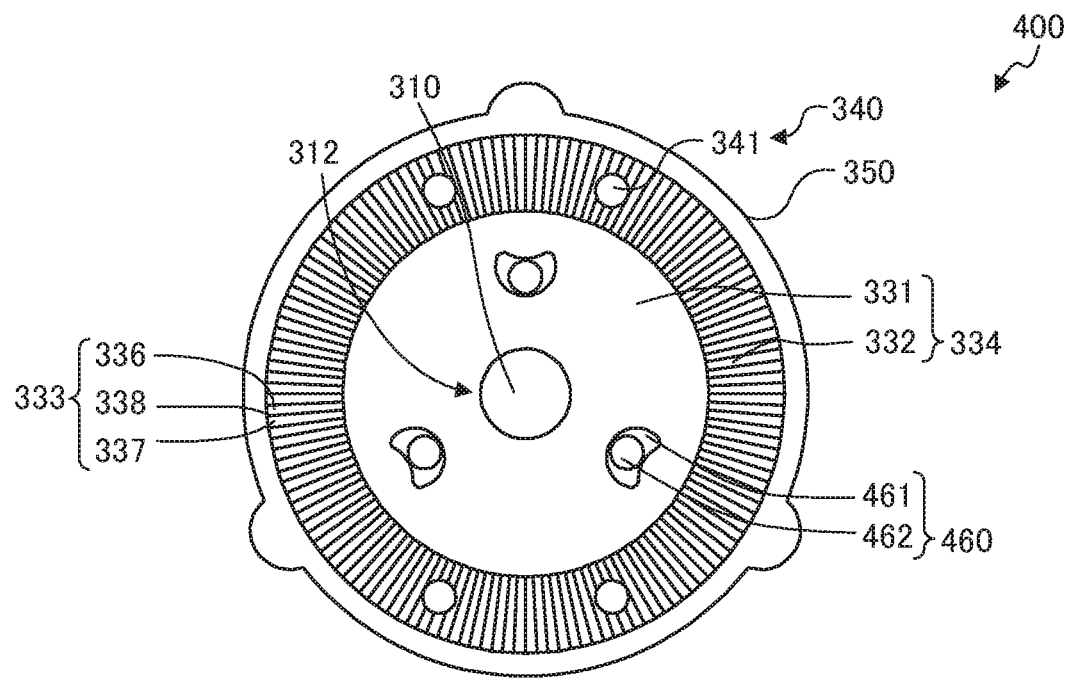

FIGS. 9A and 9B illustrate a configuration of light flux controlling member 400 according to a modification. FIG. 9A is a perspective view of light flux controlling member 400 according to the modification of Embodiment 1 as viewed from the rear side, and FIG. 9B is a bottom view of light flux controlling member 400.

As illustrated in FIGS. 9A and 9B, leg part 460 of light flux controlling member 400 according to the modification includes base seat part 461 disposed on rear surface 330 side, and contact part 462 disposed on base seat part 461. Base seat part 461 is formed in a columnar shape whose bottom surface has a crescent shape. In addition, base seat part 461 is disposed such that a concave portion faces radially outward with respect to central axis CA. Contact part 462 is formed in a columnar shape. Preferably, contact surface 463 and the surrounding rear surface have the same surface property. Light flux controlling member 400 is fixed to substrate 210 by putting contact surface 463 of contact part 462 on substrate 210 and by fixing them with an adhesive agent or the like.

Effect

As described above, in light flux controlling members 300 and 400 according to the present embodiment, protrusion 340 protrudes to the rear side relative to rear surface 330, and the end surface of protrusion 340 and at least the region surrounding protrusion 340 in rear surface 330 have properties different from each other. With such a configuration, light is reflected or refracted not only by end surface 341 of protrusion 340 but also by side surface 342 so as to diffuse the travelling directions, and thus desired light distribution characteristics can be obtained without generating local bright spots. In addition, the light-emitting device, the surface light source device and the display device including the light flux controlling member 300 or 400 do not cause luminance unevenness. Further, base seat part 461 of leg part 460 is formed in a crescent-columnar shape, and thus light directly coming from light-emitting element 220 can be diffused.

Embodiment 2

A surface light source device according to Embodiment 2 is different from surface light source device 100 according to Embodiment 1 only in the configuration of light flux controlling member 500. In view of this, the components similar to those of surface light source device 100 are denoted with the same reference numerals and the description thereof will be omitted.

Figure 10:
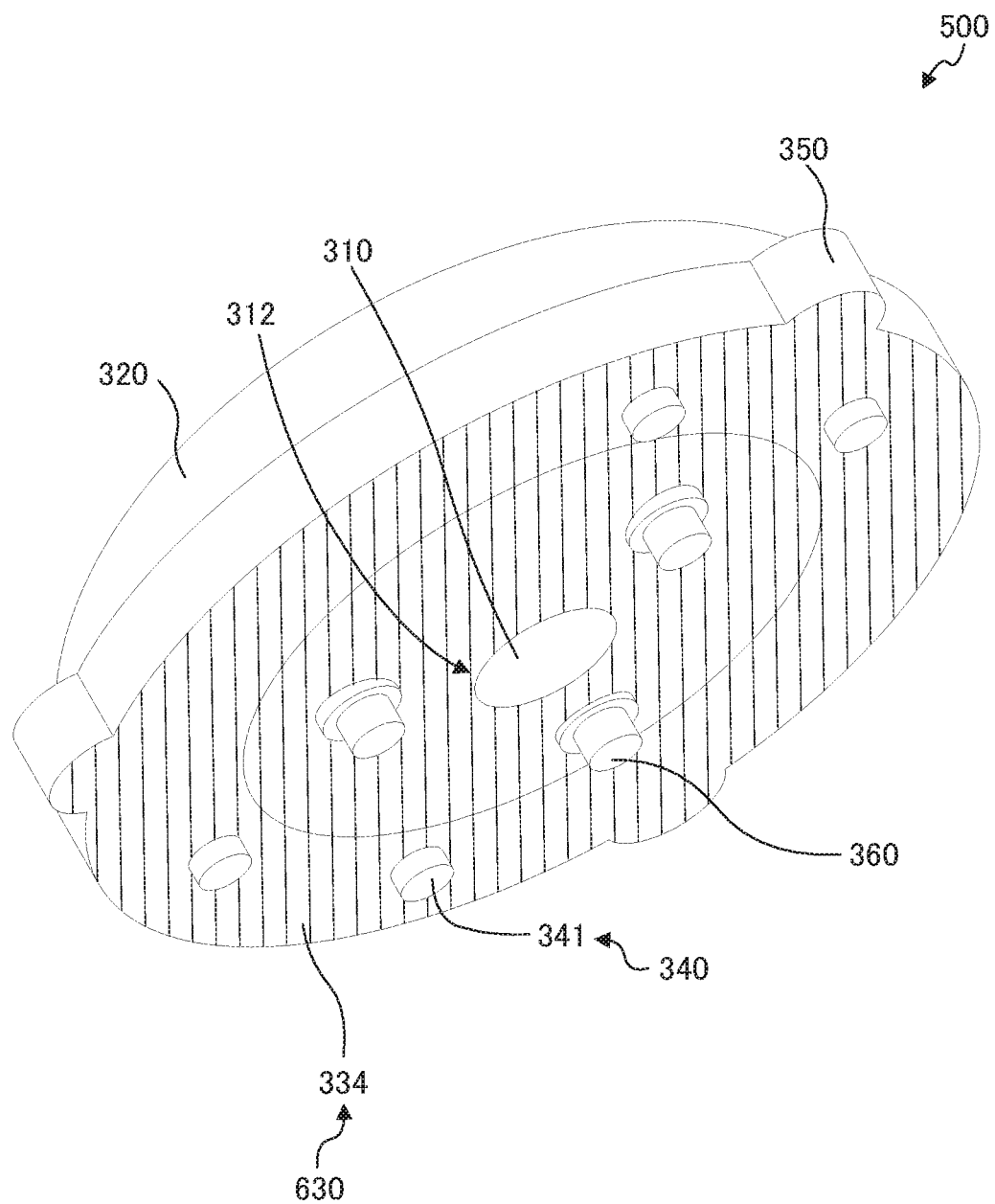
FIG. 10 is a perspective view of a light flux controlling member according to Embodiment 2 as viewed from the bottom side.
Figure 11A:
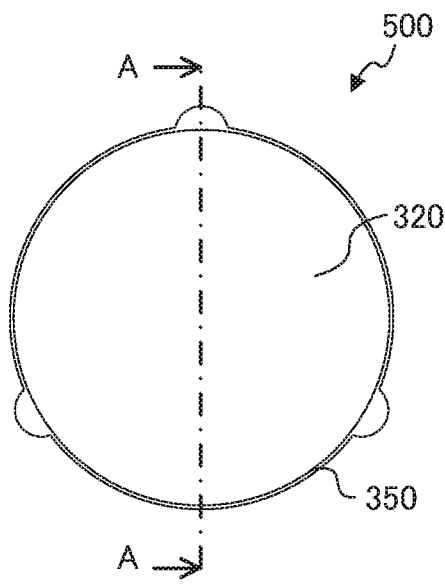
FIGS. 11A to 11D illustrate a configuration of the light flux controlling member.
Figure 11B:
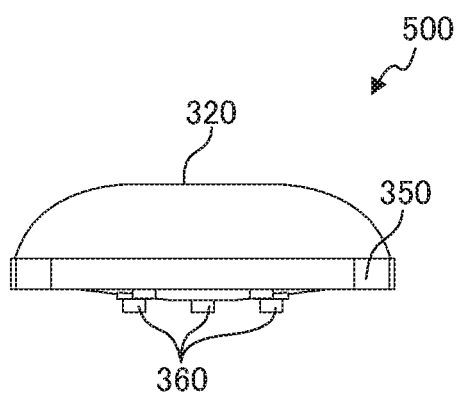
Figure 11C:
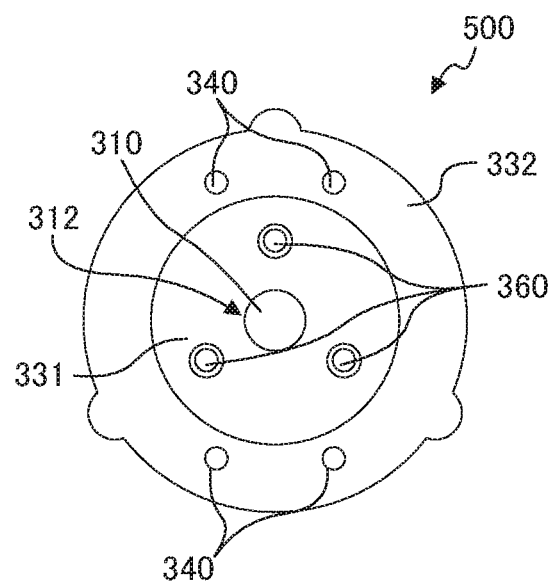
Figure 11D:
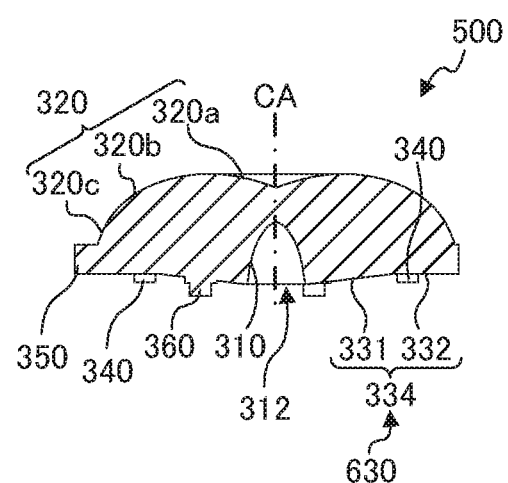

FIGS. 10 to 11D illustrate a configuration of light flux controlling member 500 according to Embodiment 2. FIG. 10 is a perspective view of light flux controlling member 500 as viewed from the rear side. FIG. 11A is a plan view of light flux controlling member 500, FIG. 11B is a front view of light flux controlling member 500, FIG. 11C is a bottom view of light flux controlling member 500, and FIG. 11D is a sectional view taken along line A-A of FIG. 11A. Note that, in FIG. 10, the hatching provided in a part of the rear side of light flux controlling member 500 indicates that the rear surface 630 and end surface 341 of protrusion 340 have different surface properties.

As illustrated in FIGS. 10 to 11D, light flux controlling member 500 according to Embodiment 2 includes incidence surface 310, emission surface 320, rear surface 630, flange part 350, and leg part 360. That is, in light flux controlling member 500 according to Embodiment 2, ridge 333 is not disposed in second inner surface 332.

In addition, also in light flux controlling member 500 according to Embodiment 2, end surface 341 of protrusion 340 and at least the region surrounding protrusion 340 in rear surface 630 have different properties. For example, rear surface 630 is a rough surface or a grain surface, and end surface 341 of protrusion 340 is a smooth surface. Rear surface 630 may be a roughened surface, or a grain surface. Also, end surface 341 of protrusion 340 may be a flat surface or a curved surface.

Modification

A surface light source device according to a modification of Embodiment 2 is different from the surface light source device according to Embodiment 2 only in the configuration of leg part 460 in light flux controlling member 600. In view of this, the components similar to those of surface light source device 100 are denoted with the same reference numerals and the description thereof will be omitted.

Figure 12A:
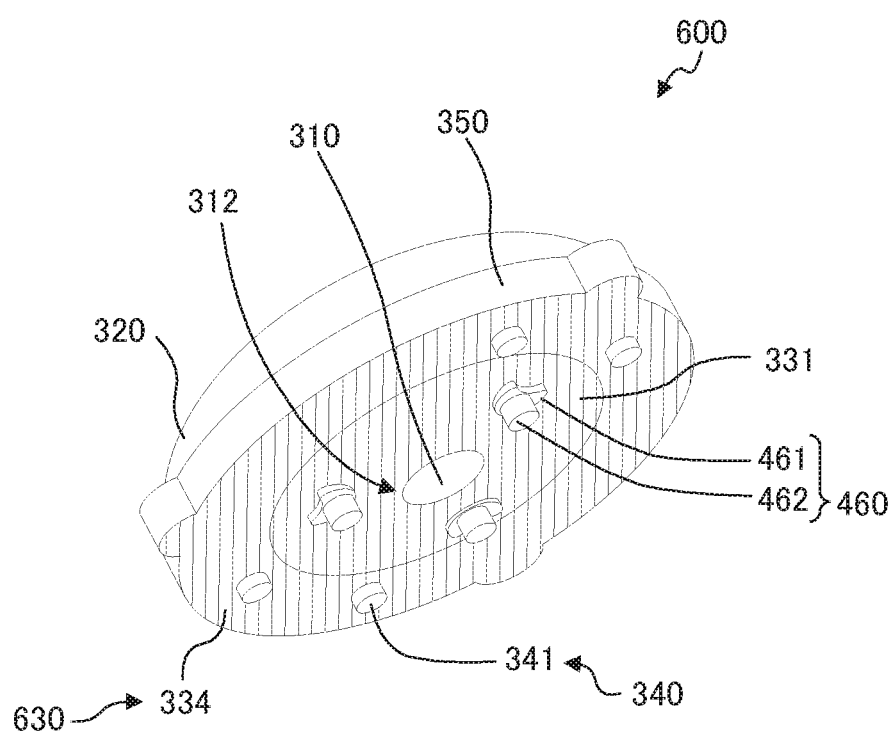
FIGS. 12A and 12B illustrate a configuration of a light flux controlling member according to a modification.
Figure 12B:
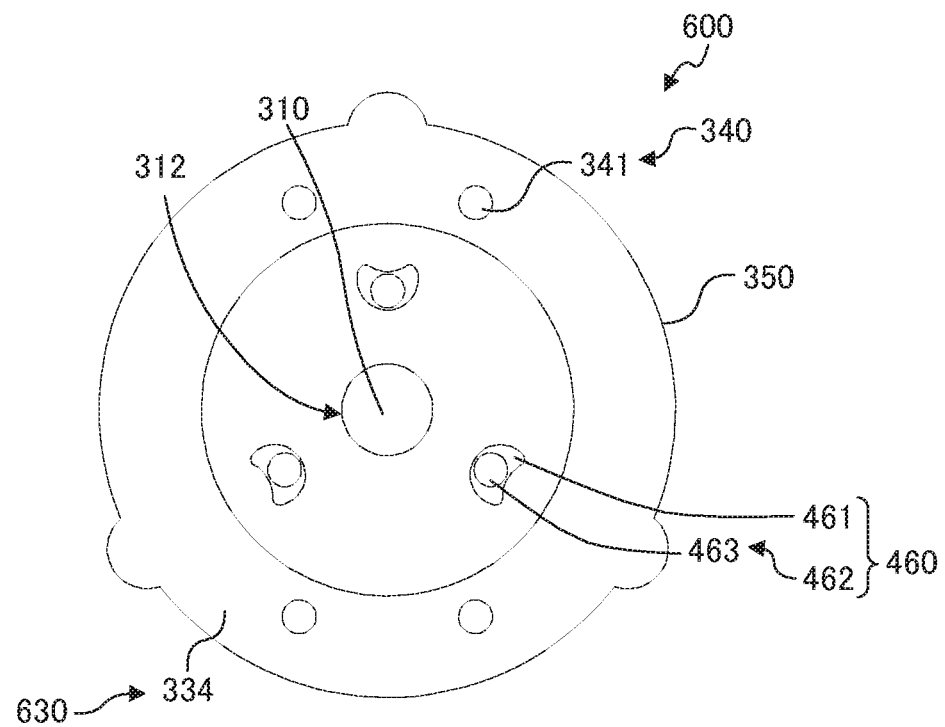

FIGS. 12A and 12B illustrate a configuration of light flux controlling member 600 according to a modification. FIG. 12A is a perspective view of light flux controlling member 600 according to the modification of Embodiment 1 as viewed from the rear side, and FIG. 12B is a bottom view of light flux controlling member 600.

As illustrated in FIGS. 12A and 12B, leg part 460 of light flux controlling member 600 according to the modification is identical to that of the modification of Embodiment 1, and includes base seat part 461 disposed on rear surface 630 side and contact part 462 disposed on base seat part 461. Base seat part 461 is formed in a columnar shape whose bottom surface has a crescent shape. Base seat part 461 is disposed such that a concave portion faces radially outward with respect to central axis CA. Contact part 462 is formed in a columnar shape. Light flux controlling member 600 is fixed to substrate 210 by putting contact surface 463 of contact part 462 on substrate 210 and by fixing them with an adhesive agent or the like.

Effect

The surface light source device according to the present embodiment provides an effect similar to that of Embodiment 1.

This application is entitled to and claims the benefit of Japanese Patent Application No. 2017-094888 filed on May 11, 2017, the disclosure each of which including the specification, drawings and abstract is incorporated herein by reference in its entirety.

INDUSTRIAL APPLICABILITY

The light flux controlling member, the light emitting device and the surface light source device according to the embodiments of the present invention are applicable to, for example, a backlight of liquid crystal display apparatuses or generally-used illumination apparatuses.

REFERENCE SIGNS LIST

10, 20 Light-emitting device
11 Light-emitting element
12, 22 Light flux controlling member
13 Incidence surface
14 Emission surface
15 Rear surface
16 Substrate
27, 28 Inclined surface
29 Recess
100 Surface light source device
100' Display device
107 Display member
110 Housing
112 Bottom plate
114 Top plate
120 Light diffusion plate
200 Light-emitting device
210 Substrate
220 Light-emitting element
300, 300A, 400, 500, 600 Light flux controlling member
310, 310A Incidence surface
312 Recess
320, 320A Emission surface
320a First emission surface
320b Second emission surface
320c Third emission surface
330, 330A, 630 Rear surface
331 First inner surface
332 Second inner surface
333 Ridge
334 Annular groove
336 First inclined surface
337 Second inclined surface
338 Ridgeline
340 Protrusion
341, 341A End surface
342 Side surface
350 Flange part
360, 460 Leg part
361 Contact surface
461 Base seat part
462 Contact part
463 Contact surface
CA Central axis of light flux controlling member
OA Optical axis of light-emitting element

What is claimed is:

1. A light flux controlling member configured to control a distribution of light emitted from a light-emitting element, the light flux controlling member comprising:
    an incidence surface that is an inner surface of a recess that is open toward a rear side of the light flux controlling member so as to intersect a central axis of the light flux controlling member, the incidence surface being configured to allow incidence of the light emitted from the light-emitting element;
    an emission surface disposed on a front side of the light flux controlling member so as to intersect the central axis, the emission surface being configured to emit, to outside, light entered from the incidence surface;

a rear surface connected with an opening edge of the recess, the rear surface being formed so as to extend away from the opening edge of the recess;

a protrusion disposed on the rear surface so as to protrude toward the rear side from the rear surface; and a leg part protruding toward the rear side from the rear surface;

wherein the leg part being configured to mount the light flux controlling member to a substrate where the light-emitting element is disposed;

wherein the leg part includes a contact surface configured to make contact with the substrate;

wherein the contact surface of the leg part is closer to the rear side than an end surface of the protrusion; and wherein the end surface of the protrusion and at least a region surrounding the protrusion in the rear surface have different properties.

2. The light flux controlling member according to claim 1, wherein an annular groove having an annular shape is formed in the rear surface so as to surround the opening edge of the recess;

wherein the annular groove includes a first inner surface and a second inner surface, the first inner surface being closer to the central axis than the second inner surface, the second inner surface being farther from the central axis than the first inner surface;

wherein in a cross section including the central axis, the second inner surface is tilted such that the second inner surface comes closer to the rear side as the second inner surface goes away from the central axis; and wherein the protrusion is disposed in the second inner surface.

3. The light flux controlling member according to claim 2, wherein a plurality of ridges are disposed in the second inner surface such that the plurality of ridges is tilted such that the plurality of ridges come closer to the rear side as the plurality of ridges go away from the central axis, the plurality of ridges being rotationally symmetrical about the central axis; and wherein each of the plurality of ridges includes a first inclined surface, a second inclined surface, and a ridgeline disposed between the first inclined surface and the second inclined surface, and each of the plurality of ridges has a substantially triangular shape in a cross section perpendicular to the ridgeline.

4. The light flux controlling member according to claim 1, wherein the end surface of the protrusion is a flat surface.

5. A light-emitting device, comprising:
a light-emitting element; and
the light flux controlling member according to claim 1 that is disposed such that the central axis is aligned with an optical axis of the light-emitting element.

6. A surface light source device, comprising:
a plurality of the light-emitting devices according to claim 5; and
a light diffusion plate configured to allow light from the plurality of light-emitting devices to pass through the light diffusion plate while diffusing the light.

7. A display device, comprising:
the surface light source device according to claim 6; and
an irradiation target member configured to be irradiated with light emitted from the surface light source device.

* * * * *